Jan. 4, 1938.   D. D. JACKSON ET AL   2,104,521
GAUGE
Filed Oct. 29, 1934
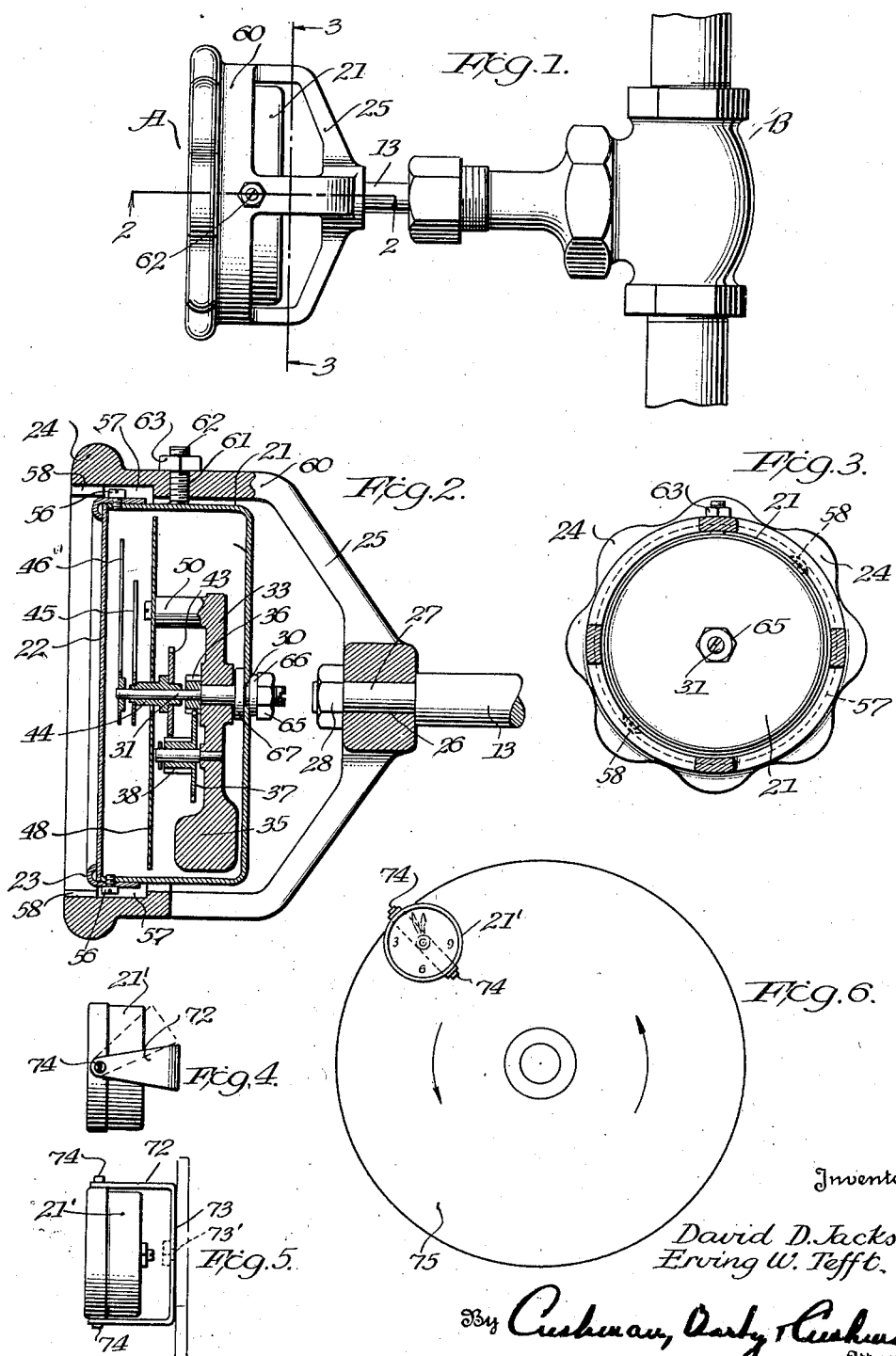
Inventors
David D. Jackson
Erving W. Tefft
By Cushman, Darby & Cushman
Attorneys Patented Jan. 4, 1938

2,104,521

UNITED STATES PATENT OFFICE 2,104,521

GAUGE

David D. Jackson, Providence, R. I., and Erving W. Tefft, South Attleboro, Mass.

Application October 29, 1934, Serial No. 750,552

8 Claims. (Cl. 116—125)

The present invention relates to improvements in a gauge of the type disclosed in our application Serial No. 713,744, filed March 2, 1934, and it will be evident that certain features of the present invention are applicable to other types of gauges.

An object of the invention is to provide a gauge of the type disclosed in our above-mentioned application which may be removably attached within the operating wheel of a rotatable element, and which may be adjustably positioned within said wheel to regulate the gauge setting.

Another object of the invention is to provide a gauge of this character, the indicating pointers of which may be moved to adjust the same from outside of the gauge casing.

A further object of the invention is to provide a gauge of this character which may be removably and adjustably secured within the operating wheel of a rotatable element, in such a manner that the gauge will be protected by said wheel.

A further object of the invention is to provide a gauge comprising a casing which may be secured within a retaining member of simple construction, and attached by said member to a rotatable element.

In the drawing, which is illustrative of two forms of the invention,

Figure 1 is a side elevation of the gauge and assembly, showing the same connected to the valve stem of a gate valve, Figure 2 is a vertical sectional view of the gauge and assembly along the line 2—2 of Figure 1, Figure 3 is a transverse vertical sectional view of the gauge assembly along the line 3—3 of Figure 1, Figure 4 is a top plan view of a modification of the gauge assembly, Figure 5 is a side elevation of the form of gauge assembly shown in Figure 4, and Figure 6 is an end view of a rotatable drum or the like having a gauge assembly of the type shown in Figures 4 and 5 attached thereto.

In Figure 1, the invention is shown applied to a gate valve for fluid control, and in this figure, A generally indicates the gauge and assembly which is a subject of this invention, it being shown as applied to a gate valve or the like designated generally by the letter B.

The valve is of conventional construction of the type shown in our application Serial No. 713,744, filed March 2, 1934, having a movable valve member adapted to be moved from closed to open position, or to be positioned at any intermediate point between closed and open position to control the flow of fluid through the line. The movable valve member is operated by the rotatable element, which is shown as a valve stem 13, said stem being rotated in the usual manner to move the valve member.

Referring to Figure 2, the gauge assembly A is shown as comprising a cylindrical casing 21 which may have its front face covered by a circular glass 22 retained in place by an annular cover ring 23. All of the working parts of the gauge are housed within the casing 21, and the latter is removably and adjustably secured within an annular supporting housing 60, which housing is secured to the rotatable element 13 in a manner which will later appear.

The housing 60 is equipped exteriorly with a plurality of lugs or projections 24, which in the particular embodiment shown, constitute a hand wheel which may be used to turn the rotatable element and move the movable valve member from open to closed position, or vice versa. While we have shown the lugs or projections 24 of suitable contour for manual operation, obviously it is within the scope of the invention to provide such projections in the form of teeth or the like so that the gauge assembly and rotatable element might be rotated by means of any suitable power transmission element, such as a drive chain or a drive gear. That is, the drive chain might engage suitable teeth 24, or a drive gear having teeth might engage teeth 24 mounted around the exterior of the supporting housing 60. Furthermore, the exterior surface of the supporting housing 60 might be made smooth in order that a transmission element such as a drive belt might impart rotation to the gauge assembly and thus to the rotatable element.

The supporting member 60 is provided with a plurality of rearwardly extending converging arms 25, which arms join at their inner ends to form a collar, said collar having an aperture 26 therein which embraces a reduced extension 27 of the rotatable element 13. The reduced extension 27 of the rotatable element is shown as the conventional reduced portion of a valve stem fashioned to receive an ordinary hand wheel. To secure the valve assembly to the rotatable element, a nut 28 is threaded onto the extension of the reduced portion 27, said nut being adapted to be tightened against the collar carried by the arms 25 after the gauge assembly has been preliminarily adjusted in position on the rotatable element.

The glass retaining ring of the gauge casing is shown secured to said casing by means of a pair of diametrically opposed retaining screws 56. The heads of these screws project outwardly from the cylindrical surface of the casing a substantial distance, and in order that the casing 21 may be rotated within the supporting housing 60 to adjust the gauge pointers, said housing is provided with a continuous interior annular channel 57 to receive the heads of the screws. In order to permit the screws 56 to enter the channel 57, the inside of the supporting sleeve at the front thereof is provided with a pair of diametrically opposed grooves 58 which extend from the front of the sleeve inwardly to the channel 57.

In positioning the gauge casing within the supporting sleeve, it is merely necessary to align the screws 56 with the grooves 58, after which the casing may be forced inwardly until the screws 56 are within the channel 57. Similarly, the gauge may be removed from the supporting housing by aligning the screws 56 with the inner ends of the grooves 58, after which the casing may easily be moved outwardly.

The inherent advantages of the removability of the gauge casing as a unit will be apparent. That is, if it is desired to substitute a differently calibrated gauge for the one in use, or to substitute a gauge in order to repair one which has been in use, it is merely necessary to remove the gauge from within the housing and wheel, rather than undertaking the more laborious task of removing the entire assembly from the rotatable element.

The supporting housing 60 is apertured at 61 to receive a retaining bolt 62, and a retaining nut 63 may be threaded to the outer end of bolt 62. The bolt 62 is threaded through the aperture 61 and its inner end abuts against the outer cylindrical surface of the gauge casing to retain the latter firmly in position within the supporting housing. While only one retaining bolt 62 is disclosed as being sufficient to retain the casing in position within the supporting member, it is obvious that any number of such bolts may be provided as is deemed practical.

It will be evident that although retaining bolt 62 will maintain the gauge casing in position when said bolt is tightened, when the bolt is loosened, the gauge casing may be rotated within the supporting housing by simply grasping the casing and turning the same. The importance of this adjustment will be later apparent.

The construction of the interior working parts of the gauge are generally similar to the construction of the same shown in our application Serial No. 713,744, filed March 2, 1934, the gear train and indicating pointers being supported and operated from a shaft 31 which is fixed to the gauge casing when the gauge is in use. Near the rear of the casing, a member 33, which is in the form of a triangular plate, is loosely mounted on shaft 31. The base of the triangular plate 33 has integral therewith a weighted portion 35, so that when the casing and shaft 31 are rotated, the plate 33 will be retained in substantially the position shown in Figure 6 by reason of its loose connection with the shaft 31, and because of the provision of the counterpoise 35 at the base of the plate.

A driving pinion 36 is keyed to shaft 31 adjacent to and in front of plate 33, this drive pinion meshing with a relatively large driven gear 37 which is rotatable on a pin projecting from the front of the plate 33. Integral with driven gear 37 and on the front face thereof is a relatively small drive gear 38. Drive gear 38 meshes with and serves to rotate a relatively large driven pinion 43, and said pinion is carried by a sleeve 44 which extends toward the forward end of the shaft 31, and is free upon the same. A small pointer 45 is rigidly secured to the forward end of sleeve 44. Similarly, a large pointer 46 is rigidly secured to the forward end of the shaft 31. An indicating device comprising a dial face 48 is connected with the stationary member 33 by means of a plurality of rods 50, said dial face being centrally apertured to permit the shaft 31 and the bushing 44 to pass through the same. By reason of the connecting members 50, and because the member 33 is maintained in fixed position when the gauge casing is rotated, the dial face will likewise be maintained in fixed position during rotations of the gauge casing.

In order to adjust the position of the indicating pointers 45 and 46 with respect to the calibrations on the dial face 48, the adjusting mechanism disclosed in Figure 2 is provided. Shaft 31 has integral therewith adjacent its rear end a collar 67, said collar being located in front of the rear face of the casing and behind the element 33. Rearwardly of collar 67, shaft 31 is reduced and smooth where it passes through an aperture 30 which is located centrally of the rear wall of the gauge casing. The shaft 31 protrudes rearwardly of the casing and is screw-threaded for the reception of a suitable washer 66 and an adjustment retaining nut 65.

It will be apparent from this construction that when the nut 65 is tightened, the gauge casing will be held between the collar 67 and the washer 66, and thus the shaft 31 will be rigid with the gauge casing. When the device is in this condition, rotations of the supporting sleeve 60 to revolve the rotatable element 13 will be imparted to the gauge casing, and thus to the shaft 31, and the gears 36, 37, 38 and 43 will operate to move the small pointer 45, and the large pointer 46 will likewise move with shaft 31, resulting in the indications described in my afore-mentioned application Serial No. 713,744, filed March 2, 1934.

If it is desired to effect an adjustment of the indicating pointers without disturbing the position of the gauge casing within the supporting housing, nut 65 may be loosened on the rearwardly protruding end of the shaft 31, after which said shaft may be rotated independently of any movement of the rotatable element and gauge casing to adjust the position of the pointers with respect to the casing and the dial face 48.

This adjustment is useful for various purposes, such as to correct any errors in the gauge resulting from long use, or to set the indicating pointers upon zero for a new position of a movable member, such as a valve member. In order to facilitate the adjustment of the indicating pointers by rotation of shaft 31, the rearwardly protruding end of said shaft may be suitably equipped to receive the end of a bent screw driver or the like.

Adjustment of the indicating pointers 45 and 46 may also be accomplished by loosening the retaining bolt 62 and manually rotating the gauge casing within the supporting housing 60. It will be evident, that because the weight 35 will hold the element 33 in a relatively fixed position, rotation of the gauge casing will effect a movement of the pointer 46 through the shaft 31, and a movement of the pointer 45 through the shaft 31 and the gear train to accomplish the adjustment, the dial face being maintained in relatively fixed position by weighted plate 33.

It is thus apparent that we have devised a gauge in which the position of the indicating pointers with respect to their dial may be adjusted by rotation of the shaft 31 independent of the gauge casing, or by rotation of the gauge casing itself. Obviously, a gauge may be equipped with either one of or both of these adjustments, as desired.

A further and more simple embodiment of the invention is shown in Figures 4 and 5, wherein the gauge casing 21' is held as a unit between the legs 72 of a simple substantially U-shaped bracket 73. The gauge casing may be secured between the legs 72 by means of screws or the like 74, either rigidly or in such manner that the gauge may be moved with respect to the bracket, as shown by the dotted line position of the bracket in Figure 4. In this connection, the pivotal movement of the gauge with respect to the bracket will make more convenient the adjusting of the indicating pointers by means of the rearward extension of the shaft 31, which carries the indicating pointers, said means being shown in Figure 2. The base of the bracket has at its center a suitable aperture 73' which is used in securing the gauge assembly to a rotatable element in any suitable manner.

This simple embodiment, as disclosed in Figures 4 and 5, may be mounted upon a light rotatable element, such as the spindle of a small valve, and the spindle may be rotated by simply grasping the casing 21' and revolving the same.

A further use of this embodiment is disclosed in Figure 6, in which figure the gauge assembly of Figures 4 and 5 is shown mounted eccentrically upon a rotatable drum 75.

It is obvious that the invention disclosed in the present specification has many other applications, and the manner of connecting the gauge assembly to other devices will be apparent from the above description of its connection to a valve or the like.

It will be understood that the invention is not limited to the details of construction shown in the drawing and described in the specification, and that the examples of the use of the device which have been given do not include all of the uses of which the device is capable; also, that the phraseology employed in the specification is for the purpose of description and not of limitation.

We claim:—

1. In a device of the character described, a rotatable element, a gauge comprising as a complete unit a casing attached to said element and adapted to rotate therewith, an indicating device in said casing, means for maintaining said device in fixed position with respect to the vertical during rotation of said rotatable element, a cooperating indicating member carried by said casing for indicating the rotations of said element, and means connecting said indicating member to said casing whereby said last named member may be moved with respect to said casing to adjust the position of the same without dismantling said gauge or removing the same from said element.

2. In a gauge for indicating the rotations of an element, a casing secured to said element to rotate therewith, an indicating device in said casing, means for retaining said device in fixed position, a cooperating indicating member carried by said casing for indicating the rotations of said element, and means for connecting said indicating member with said casing for cooperation with said device, said connecting means being constructed and arranged for disengagement from said casing to adjust said indicating member with respect to said device without dismantling said gauge or removing the same from said element.

3. In combination, a rotatable element, a supporting member attached to said element, said supporting member being adapted to receive power to rotate the same and to thereby rotate said element, a gauge comprising as a complete unit a casing, an indicating device in said casing, means for retaining said device in fixed position, and an indicating member in said casing for cooperation with said device and means for mounting said casing on said supporting member for rotation therewith to actuate said indicating member, said mounting means and said gauge being constructed and arranged for adjustment of said casing with respect to said supporting member to adjust said indicating member with respect to said device and for removal of said gauge as a unit from said supporting member without dismantling said gauge.

4. In combination, a rotatable element, a supporting sleeve attached to said element, said supporting sleeve being adapted to receive power to rotate said element, a gauge comprising as a complete unit a casing, an indicating device in said casing, means for retaining said device in fixed position, and an indicating member in said casing for cooperation with said device, and means for mounting said casing in said sleeve for rotation therewith to actuate said indicating member, said mounting means and said gauge being constructed and arranged for adjustment of said casing in said sleeve to adjust said indicating member with respect to said device, and for removal of said gauge as a unit from said sleeve without dismantling said gauge.

5. In combination, a rotatable element, a supporting sleeve attached to said element, said supporting sleeve being adapted to receive power to rotate said element, a gauge comprising as a complete unit a casing, an indicating device in said casing, means for retaining said device in fixed position, and an indicating member in said casing for cooperation with said device, means for mounting said casing in said sleeve for rotation therewith to actuate said indicating member, said mounting means and said gauge being constructed and arranged for adjustment of said casing in said sleeve to adjust said indicating member with respect to said device, and for removal of said gauge as a unit from said sleeve without dismantling said gauge, and means for locking said casing in adjusted position in said sleeve.

6. In combination, a rotatable element, a supporting sleeve attached to said element, said sleeve being adapted to receive power to rotate said element, an annular channel on the inside of said sleeve, a gauge comprising as a complete unit a casing containing indicating means mounted in said sleeve, and a projection on said casing which extends into said channel to prevent removal of said casing from said sleeve but which permits said casing to be rotated in said sleeve to adjust said indicating means.

7. In combination, a rotatable element, a supporting sleeve attached to said element, said sleeve being adapted to receive power to rotate said element, an annular channel on the inside of said sleeve, a gauge comprising as a complete unit a casing containing indicating means mounted in said sleeve, a projection on said casing which extends into said channel to prevent removal of said casing from said sleeve but which permits said casing to be rotated in said sleeve to adjust said indicating means, and means for locking said casing in adjusted position in said sleeve.

8. In combination, a rotatable element, a supporting member attached to said element, said supporting member being adapted to receive power to rotate the same and to thereby rotate said element, a gauge comprising as a complete unit a casing, an indicating device in said casing, means for retaining said device in fixed position, a stub shaft carried by said casing within the same, an indicating member for cooperation with said device mounted for rotation with said stub shaft, and means for disengaging said stub shaft from said casing for adjustment of said indicating member with respect to said device without dismantling said gauge, and means for mounting said casing on said supporting member for rotation therewith to actuate said indicating member, said mounting means and said gauge being constructed and arranged for removal of said gauge as a unit from said supporting member without dismantling said gauge.

DAVID D. JACKSON.
ERVING W. TEFFT.